United States Patent [19]
Cruson et al.

[11] 3,931,379
[45] Jan. 6, 1976

[54] FOAMED PROFILE EXTRUSION PROCESS
[75] Inventors: Bob Joe Cruson; Ronald D. Medley, both of Big Spring, Tex.
[73] Assignee: Cosden Oil & Chemical Company, Big Spring, Tex.
[22] Filed: July 17, 1973
[21] Appl. No.: 380,010

[52] U.S. Cl. ............ 264/45.5; 260/2.5 F; 264/46.1; 264/54; 264/101; 264/177 R; 264/DIG. 5; 264/DIG. 14; 428/315
[51] Int. Cl.² ..................... B29D 27/00; B29F 3/06
[58] Field of Search ...... 264/48, 51, 53, 54, DIG. 5, 264/DIG. 14, 45.5, 46.1, 177 R; 260/2.5

[56] References Cited
UNITED STATES PATENTS

| | | | |
|---|---|---|---|
| 2,941,964 | 6/1960 | Houston et al. | 264/DIG. 5 |
| 2,941,965 | 6/1960 | Ingram | 264/DIG. 5 |
| 3,344,092 | 9/1967 | Pavuk | 264/DIG. 5 |
| 3,431,163 | 3/1969 | Gilbert | 264/48 X |
| 3,431,164 | 3/1969 | Gilbert | 264/48 X |
| 3,461,496 | 8/1969 | Winstead | 264/48 UX |
| 3,764,642 | 10/1973 | Boutillier | 264/54 X |

FOREIGN PATENTS OR APPLICATIONS

| | | | |
|---|---|---|---|
| 2,063,589 | 6/1971 | France | 264/48 |

OTHER PUBLICATIONS

"Hackh's Chemical Dictionary", Third Edition completely revised and edited by Julius Grant, New York, McGraw-Hill, c. 1944, pp. 11–14.

Primary Examiner—Philip Anderson
Attorney, Agent, or Firm—Bacon & Thomas

[57] ABSTRACT

A process for the manufacture of profiled products by extruding in a substantially non-expanded state an expandable styrene polymer composition through a die orifice having the desired profile and subsequently passing the extruded material through a sizing member wherein it expands to the desired profile and cross-section to produce an article having a porous inner cross-section and a solid, non-foamed outer layer and wherein the styrene polymer composition employed is one containing from about 0.2 to 1.0 parts by weight of an alkaline earth metal carbonate blowing agent and from about 0.2 to 1.0 parts by weight of an organic acid per 100 parts by weight of styrene polymer.

4 Claims, 4 Drawing Figures

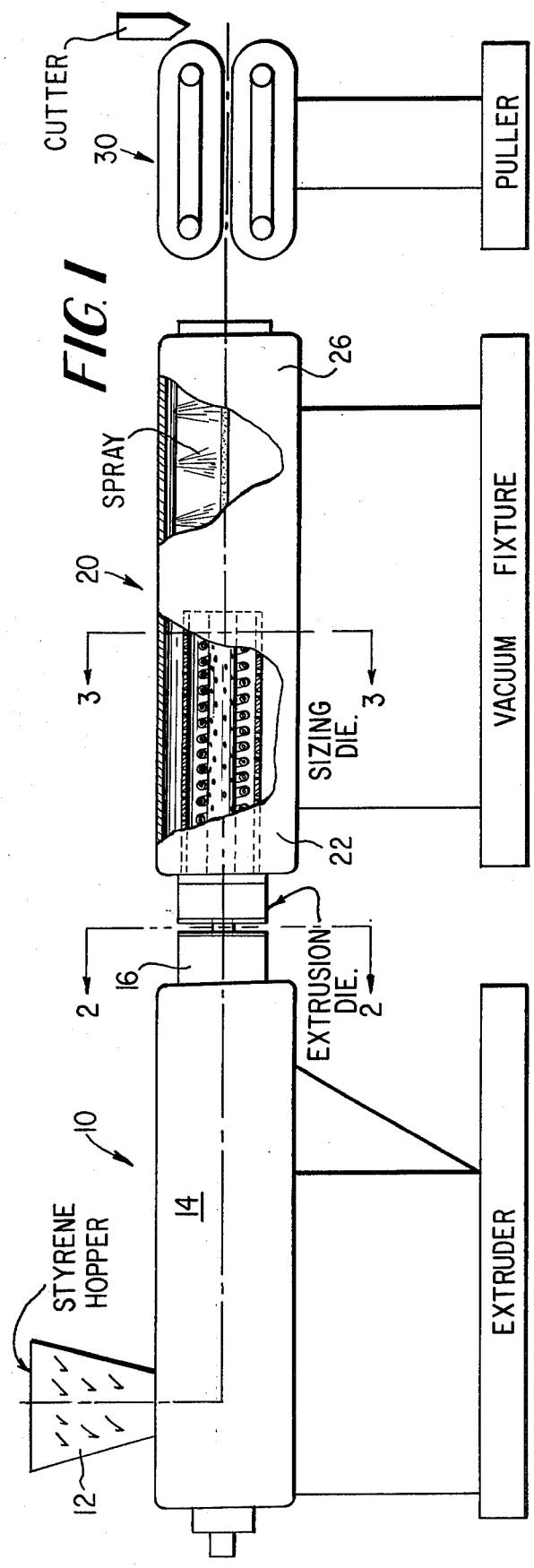
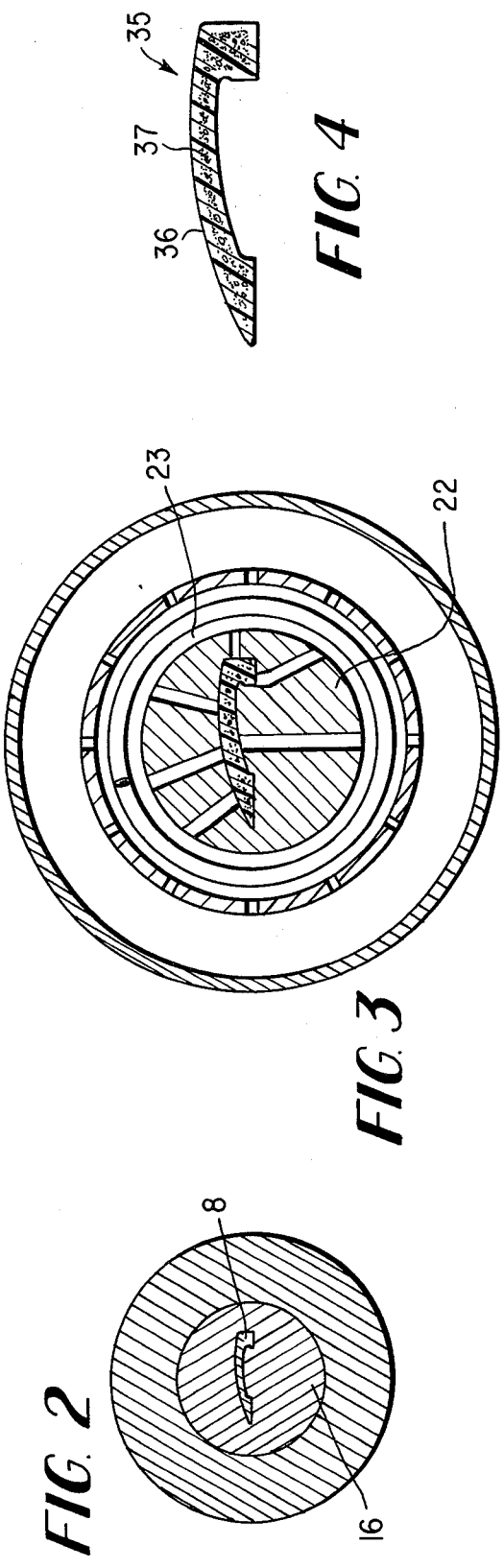

FOAMED PROFILE EXTRUSION PROCESS

BACKGROUND OF THE INVENTION

The present invention relates to the manufacture of profiled products by extrusion of expandable synthetic resinous material, and more especially pertains to the production of profiled products having non-foamed surfaces by the extrusion of styrene polymer compositions having a particular formulation.

Relatively recently processes have been developed for the production of profiled products by extrusion of certain expandable synthetic resinous materials, particularly polyvinyl chloride, polyamides, polycarbonates, polyurethanes and the like. These processes are characterized in that the synthetic resinous material is extruded through an extrusion die in a substantially unexpanded state, the extrusion die having the shape of the profile desired, and thereafter allowing the resinous material to expand in a shaping chamber which has the same profile as the extrusion die orifice and in addition is of the final desired cross-sectional area of the ultimate product to be obtained. As the resinous material expands against the walls of the shaping chamber, the outer surfaces of the profiled product thus formed take on a smooth, non-foamed character whereas the interior portion of the article cross-section remains as a light weight, porous material. Alternatively, there may also be a hollow internal cavity positioned inside the extruded aricle, and the process may be carried out such that the surface layer surrounding such an internal cavity is also of a non-foamed character.

As is the case with profile extrusion methods utilizing any of the above-mentioned polymeric materials, and particularly when effort is made to employ styrene polymer compositions in such profile extrusion, many problems arise in achieving an extruded product having a good, smooth, relatively hard and tough non-foamed surface and in obtaining such surface without loss of desired density of the final profile. Although a multitude of known expandable styrene polymer compositions, i.e., styrene polymer plus blowing agent and optionally a nucleating agent, are known for expanding polystyrene in sheet extrusion and in other applications, it has been found that the majority of such known compositions capable of producing expanded polystyrene do not provide the desired results in terms of density and surface characteristics when utilized in profile extrusion. Moreover, because it is necessary to initially extrude the polymeric material in a substantially unexpanded state, when utilizing many of the known expandable styrene polymer compositions it is necessary to introduce the blowing agent into the styrene polymer material at a point well advanced through the extrusion equipment, i.e., only shortly before the material passes through the extrusion orifice. This, of course, is a disadvantageous feature which adds an additional requirement to conventional extrusion processes and requires a greater outlay for equipment. Even in those expandable styrene polymer compositions which permit the blowing agent to be pre-incorporated in the polymeric material, e.g., see for example, application Ser. No. 380,009 filed concurrently herewith, problems arise because of susceptibility to temperature degradation and poor shelf life.

SUMMARY OF THE INVENTION

Accordingly, it is an object of the present invention to provide a process for extruding profiled products which is capable of yielding products exhibiting excellent density and surface characteristics.

It is a further object of the present invention to provide a profile extrusion process which permits the use of conventionally designed extrusion equipment for the resinous material.

A further object of the present invention is to provide a profile extrusion process wherein the polymeric extrusion composition is resistant to temperature degradation, has a long shelf life and is not affected by the presence of moisture.

Another object of the present invention resides in the provision of a profile extrusion process wherein a particularly formulated styrene polymer composition is employed to produce profiled extrusion products having outstanding density and surface characteristics.

Thus, in accomplishing the foregoing objects, there is provided in accordance with the present invention a process for the manufacture of profiled products by the steps of extruding an expandable synthetic resinous material in substantially unexpanded condition through a die orifice having the desired profiled configuration and subsequently passing the resinous material through a sizing member having the desired profile and cross-section, in which the resinous material fully expands within the confines of the sizing member to produce the desired product having a non-foamed outer surface of resinous material and a foamed interior cross-section. The particular improvement underlying the present invention resides in utilizing as the expandable synthetic resinous material a styrene polymer containing from about 0.2 to 1.0 parts of an alkaline earth metal carbonate together with from about 0.2 to 1.0 parts by weight of a organic acid as the blowing agent per 100 parts by weight of styrene polymer. Preferably, approximately equal amounts of acid and blowing agent are employed. In the subject compositions, calcium carbonate and magnesium carbonate are preferred as the alkaline earth metal carbonates and citric acid is the preferred organic acid. In utilizing these compositions, it is possible to incorporate the blowing agent combination into the styrene polymer at or before the feed point of the extrusion equipment so that all of the ingredients are passed through the equipment together, without any detrimental heat degradation effects.

Other objects, features and advantages of the present invention will become readily apparent from the detailed description of the invention which follows when read in light of the accompanying drawings.

BRIEF DESCRIPTION OF THE DRAWINGS

In the drawings:

FIG. 1 is a diagrammatic representation of the various stages in the profile extrusion process according to the present invention;

FIG. 2 is a cross-sectional view of the extrusion die taken along the line 2—2 of FIG. 1;

FIG. 3 is a cross-sectional view of the sizing die taken along the line 3—3 of FIG. 1; and FIG. 4 is a cross-sectional end view of a profile extrusion product manufactured in accordance with the process of the invention.

DETAILED DESCRIPTION OF THE INVENTION

The present invention is based upon the discovery that many problems associated with the profile extrusion of styrene polymer compositions may be overcome if a particular combination of ingredients is employed in conjunction with conventional styrene polymeric material. The compositions according to the present invention which permit the use in profile extrusion processes of styrene polymers are advantageous in one sense because they permit the production of profiled, extruded products which manifest an extremely smooth and relatively hard and tough non-foamed surface. On the other hand, the compositions of the present invention also produce an extruded product wherein the styrene polymer is blown to the proper density and therefore exhibits the desired porous interior cross-section in the extruded article. Furthermore, it has been found, in contradistinction to those ingredients employed in most conventional extrusion processes, that the combination of additives to affect proper expansion in the process of the present invention may be incorporated in the styrene polymer concurrent with or previous to its introduction at the feed point of the extrusion apparatus. As a result, the styrene polymer and this combination of additives are passed through the extrusion apparatus concurrently, thereby resulting in more uniform distribution of the latter throughout the mass of polymeric material. At the same time, however, because of the advantageous nature of the additive combination utilized in the subject process, there are no adverse effects to the extrusion mixture due to temperature degradation.

Styrene polymers which may be employed in the process of the present invention are those which are conventionally known in connection with profile extrusion processes. Most preferred in this category are homopolymers of styrene and graft copolymers of styrene monomers with a minor percentage of an unsaturated, rubbery polymeric material, i.e., impact polystyrenes. However, also useful within the context of the present profile extrusion process are copolymers comprising a major portion of polymerized styrene monomer and a minor amount of one or more ethylenically unsaturated monomers copolymerized therewith. Examples of suitable comonomers include acrylonitrile, butadiene, acrylic acid, lower alkyl acrylates, lower alpha olefins, such as ethylene, propylene and 1-butene, acrylamide, etc. Therefore, it is to be understood that the term "styrene polymer" is used throughout the present application to encompass any of the above-delineated polymeric materials based primarily on styrene monomer.

The additive combination to be used in the profile extrusion process according to the present invention comprises an alkaline earth metal carbonate, preferably calcium carbonate or magnesium carbonate, together with one or more organic acids. The purpose of the alkaline earth metal carbonate is to act as a blowing agent and to generate a gas, typically $CO_2$, within the mass of polymeric material in order to cause foaming or expansion of the material. In this respect, the alkaline earth metal carbonates are known in the art as $CO_2$-producing agents in conjunction with conventional foaming techniques wherein completely foamed products are produced in contradistinction to the profiled extrusion products having a non-foamed surface layer as produced in accordance with the process of the present invention. The alkaline earth metal carbonates have not, however, found any practical or widespread utility even in connection with standard foaming techniques. Likewise, the use of organic acids with certain $CO_2$ generating compounds is known, but once again such combinations have not proved successful in normal foam extrusion methods and they have not been applied to methods for producing structural profiled extrusion products having a non-foamed surface layer. The purpose of the organic acid in the present composition is to permit use of the alkaline earth metal carbonate blowing agent and to reduce the cell size of the foamed portion of the structure which permits greater strength at desired densities. This is quite important since the present invention is not concerned with the particular compositions per se which are to be extruded, but rather with the use of particular compositions within the context of a particularly defined profile extrusion process. Furthermore, it has been discovered not only that the combination of alkaline earth metal carbonates among the multitude of known blowing agents for styrene polymers and an organic acid, is especially well suited in combination for forming the desired foam structure within the profile extrusion process of the present invention, but also that the subject combination must be employed within a specific range in order to produce profiled products having the desired surface and density characteristics. Specifically, it has been found that the alkaline earth metal carbonate must be employed within the range of about 0.2 to 1.0 parts by weight, preferably 0.3 to 0.6 parts by weight, per 100 parts by weight of styrene polymer, and that the organic acid also must be present in an amount of from about 0.2 to 1.0 parts, preferably 0.3 to 0.6 parts, on the same basis. Suitable organic acids include citric, oxalic, etc. with citric being preferred. The final blown styrene polymer product should have a density of between about 0.30 to 0.60, preferably between 0.35 to 0.45.

A further ingredient which may optionally be included in the styrene polymer compositions of the invention is a nucleating agent such as talc. If such material is employed, it generally is present in an amount of from about 0.1 to about 0.5 parts by weight per 100 parts by weight of styrene polymer.

The general process methods for the production of profiled, structural foamed products are well known in the art. Such processes typically involve (1) the extrusion by means of conventional extrusion equipment of a polymer composition containing a blowing agent in substantially unexpanded condition through an extrusion die orifice having the shape of the ultimately desired product, but being considerably smaller in cross-sectional area than the final product, and (2) passing this extruded stream of polymeric material to a sizing die which has both the profile and cross-sectional area of the final desired product. In the sizing die, the polymeric material is permitted to freely expand, and because of the pressure of the gases released by the blowing agent, the foamed material is forced against the walls of the sizing die to form a solid, non-foamed surface on the extruded product. After thus obtaining its final configuration, the extruded product is typically passed through a zone where it is cooled, and it is then cut into the desired length. The steps of sizing and cooling the extruded product may advantageously be carried out in a device which is connected to a source of vacuum, and temperature control in this device may be provided by the circulation of a fluid in the jacket of the device, by the provision of electrical heating elements or by direct contact with a cooling medium such as water.

Referring now to the drawings, in FIG. 1 is illustrated schematically an apparatus suitable for carrying out the process of the present invention. Designated generally by reference numeral 10, is an extrusion apparatus consisting of a feed hopper 12 for introduction of the polymeric composition into the extruder, the hopper 12 being positioned on the top surface of the rear end of the extruder, a barrel portion 14 wherein the polymeric material is heated to a molten condition, mixed thoroughly with the alkaline earth metal carbonate and (hydroxy) organic acid and advanced by means of a conventional extruder screw (not illustrated). The entire mass is extruded through an extrusion die 16 located at the forward end of the apparatus. A typical configuration of extrusion die 16 designed for the production of a conventional floor or framing molding is illustrated in FIG. 2 of the drawings wherein a cross-sectional view is presented through the extrusion die orifice from right to left in the drawings. As can be seen from FIG. 2, the polymeric material 8 is in a substantially unexpanded condition as it passes through the orifice or extrusion die 16.

Next in the chain of apparatus for the profile extrusion process is a vacuum fixture designated generally by reference numeral 20 in FIG. 1. The vacuum fixture 20 is constructed to contain in approximately the first half of its length, a sizing die 22 into which the stream of extruded thermoplastic material 8 passes immediately after its exit from the extrusion die 16. As is illustrated by FIG. 3 of the drawings, the sizing die 22 has a profile shape identical to that of the extrusion die 16, but the cross-sectional area of the cavity in the sizing die is considerably larger than that of the extrusion die in order to permit free expansion of the polymeric material. The peripheral area 23 around the sizing die 22 is maintained under vacuum, and the internal cavity 24 of sizing die 22 is in communication with this vacuum by means of a plurality of apertures in the outer surfaces of sizing die 22. The outer surfaces of sizing die 22 are also maintained at a temperature which is below the gelling point of the polymeric material so that the latter, upon being forced against the outside wall as a result of the pressure generated from within, is immediately formed into a hard, solid surface. It will be appreciated that the thickness of the outer non-foamed surface of polymeric material may be regulated by controlling the temperature of the inner surfaces of sizing die 22, the higher the temperature, the thinner this non-foamed surface being. The latter half of vacuum fixture 20 is constituted by a cooling chamber 26 also maintained under vacuum. In cooling chamber 26, the final extruded product is cooled as nearly as possible to ambient temperatures in order to further solidify the solid, non-foamed surface as well as the foamed interior cross-section of the article. Cooling is suitably achieved by contacting the extruded article with a fine spray of cooling water.

Movement of the polymeric material and final extruded product through the process steps is achieved through a combination of the screw in extruder 10 and a drawing caterpillar designated by reference numeral 30 in FIG. 1. The drawing caterpillar may be employed to move the extruded article without any fear of damaging the exterior surfaces of the article as a result of the hard, non-foamed surface which is produced during the sizing and cooling steps. When the extruded article leaves the drawing caterpillar, it may be cut into any desired shape and further handled in accordance with conventional procedures.

In FIG. 5 is illustrated a cross-section of a typical section of tear drop molding 35 manufactured in accordance with the process of the invention. The molding exhibits a solid, non-foamed surface 36 (somewhat exaggerated for purposes of illustration) which surrounds the remainder of the internal cross-section formed of expanded polymeric material 37. As is well understood by persons of ordinary skill in the art and as mentioned above the thickness of the solid, outer surface of material can be regulated to a certain degree by selection of the temperatures at which the molten plastic material is extruded and at which the wall of the sizing die is maintained. Generally, in the case of styrene polymers, the temperature at which the material is extruded falls within the range of about 270° to about 350°F. and the temperature at which the interior surface of the sizing die is maintained falls within the range of about 290° to about 310°F.

The following examples are included to more fully illustrate the present invention, it being understood that the same are intended to be merely illustrative and under no circumstances are to be considered as limitative:

EXAMPLE 1

100 parts by weight of styrene homopolymer beads (Cosden Oil & Chemical Company - Resin No. 550), 0.5 parts by weight of calcium carbonate and 0.5 parts by weight of citric acid are added to the feed hopper of a 2½ inch diameter single stage vented extruder containing a 4:1 compression ratio screw. The mixture of ingredients is passed through the extruder at an average temperature of about 330°F. and at a feed rate of approximately 100 pounds per hour. The thoroughly mixed composition of ingredients, still in a substantially unexpanded condition, is then forced through an extrusion die at a temperature of 310°F., the die having the shape of a tear drop molding with an overall horizontal dimension of approximately 2 inches and an average vertical dimension of approximately ½ inch. After passing through the extrusion die, the stream of polymeric material is passed into a sizing die arranged coaxially with the extrusion die. The shape of the sizing die cross-section is identical to that of the extrusion die, but its dimensions are those of the finally desired product, being approximately 2¼ inches horizontally and having a vertical dimension of approximately 0.565 inches. The walls of the sizing die are maintained at 110°F. by means of a water cooling jacket surrounding same and the interior surfaces of the sizing die also possess a multitude of small apertures which communicate with a vacuum source surrounding the entire sizing die. There exists from the sizing die a substantially solidified product having a solid, smooth, integral non-foamed outer surface of polystyrene and an inner cross-sectional area characterized as being porous. This solid product is then passed through a second chamber wherein it is cooled by being contacted with a fine spray of cold water at a temperature of 100°F. The molded product is pulled from the cooling chamber by means of a drawing caterpillar and is subsequently cut into lengths and stacked. The outer surface of the final product is smooth and blemish free and the density of the product is 0.4.

EXAMPLES 2 – 8

The procedure of Example 1 is repeated except that the amount of alkaline earth metal carbonate and (hydroxy) organic acids employed was varied. The amounts of these components are expressed as parts per hundred weight of styrene polymer. The results of these examples are summarized in the table below:

| Amount Calcium Carbonate | Amount Organic Acid | Resultant Product Density |
| --- | --- | --- |
| 1.0 | 0.5 | 0.4 |
| 0.5 | 1.0 | 0.4 |
| 1.0 | 1.0 | 0.2 |
| 0.3 | 0.3 | 0.7 |
| 0.5 | 0.5 | 0.4 |

EXAMPLE 9

Example 1 is repeated with the exception that no citric acid is employed. No blowing or foaming of the styrene polymer is observed on extrusion from the die or within the sizing die.

Thus, there has been provided in accordance with the present invention a process for the production of molded profile extrusion products having highly desirable surface and density characteristics. These outstanding results are achieved in the process of the invention by the use of a particular combination of a styrene polymer and blowing agent formulation.

While the foregoing invention has been described with reference to several specific embodiments thereof, it is to be understood that certain modifications thereof will become readily apparent to a person of ordinary skill in the art upon reading this application. Therefore, it is intended that the proprietary rights defined by the present application be limited only by the scope of the claims appended hereto.

What is claimed is:

1. A process for the manufacture of profiled products having a specific gravity of from about 0.3 to 0.6 by the steps of extruding an expandable styrene polymer composition in substantially unexpanded condition through a die orifice having the desired profile and subsequently passing the resinous material through a sizing member having the desired profile and cross-section whereupon the resinous material fully expands within the confines of said sizing member to produce the desired product having a non-foamed outer layer of styrene polymer and a foamed interior cross-section and wherein the expandable styrene polymer composition is one consisting essentially of from about 0.2 to 1.0 parts by weight of an alkaline earth metal carbonate and from about 0.2 to 1.0 parts by weight of citric acid as a blowing agent per 100 parts by weight of styrene polymer.

2. The process of claim 1 wherein said alkaline earth metal carbonate is selected from the group consisting of calcium carbonate and magnesium carbonate.

3. The process of claim 1 wherein said styrene polymer is homopolystyrene.

4. The process of claim 1 wherein said styrene polymer is impact polystyrene.

* * * * *